US007996298B1

(12) United States Patent  
Catane (10) Patent No.: US 7,996,298 B1  
(45) Date of Patent: Aug. 9, 2011

(54) REVERSE AUCTION SYSTEM, METHOD AND COMPUTER PROGRAM PRODUCT

(75) Inventor: Avishai Catane, Bet Shemosh (IL)

(73) Assignee: Amdocs Software Systems Limited, Dublin (IE)

( * ) Notice: Subject to any disclaimer, the term of this patent is extended or adjusted under 35 U.S.C. 154(b) by 805 days.

(21) Appl. No.: 11/218,224

(22) Filed: Aug. 31, 2005

(51) Int. Cl.
*G06Q 40/00* (2006.01)
(52) U.S. Cl. ............................................ 705/37; 705/26
(58) Field of Classification Search ..................... 705/26, 705/35–45
See application file for complete search history.

(56) References Cited

U.S. PATENT DOCUMENTS

| | | | | |
|---|---|---|---|---|
| 5,873,071 | A * | 2/1999 | Ferstenberg et al. ........ | 705/36 R |
| 6,647,373 | B1 * | 11/2003 | Carlton-Foss ................ | 705/37 |
| 6,985,880 | B1 * | 1/2006 | Hodgdon et al. ........... | 705/36 T |
| 7,117,175 | B2 * | 10/2006 | Arnott ......................... | 705/36 R |
| 7,152,042 | B1 * | 12/2006 | Arkes ........................... | 705/37 |
| 7,165,044 | B1 * | 1/2007 | Chaffee ........................ | 705/37 |
| 7,222,093 | B2 * | 5/2007 | Block et al. ................. | 705/35 |
| 7,376,593 | B2 * | 5/2008 | Schulze ........................ | 705/26.3 |
| 2002/0099644 | A1 * | 7/2002 | Kemp et al. ................. | 705/37 |
| 2002/0111897 | A1 | 8/2002 | Davis ........................... | 705/37 |
| 2002/0120552 | A1 * | 8/2002 | Grey et al. ................... | 705/37 |
| 2002/0143682 | A1 * | 10/2002 | Bergmann et al. .......... | 705/36 |
| 2002/0147674 | A1 * | 10/2002 | Gillman ........................ | 705/37 |
| 2003/0004850 | A1 * | 1/2003 | Li et al. ....................... | 705/37 |
| 2003/0069825 | A1 * | 4/2003 | Hoffman et al. ............. | 705/37 |
| 2003/0088489 | A1 * | 5/2003 | Peters et al. ................. | 705/36 |
| 2003/0088494 | A1 | 5/2003 | Lee .............................. | 705/37 |
| 2003/0126054 | A1 * | 7/2003 | Purcell, Jr. ................... | 705/36 |
| 2003/0144947 | A1 * | 7/2003 | Payne ........................... | 705/37 |
| 2003/0172018 | A1 * | 9/2003 | Chen et al. .................. | 705/36 |
| 2003/0208427 | A1 * | 11/2003 | Peters et al. ................. | 705/36 |
| 2003/0229574 | A1 * | 12/2003 | Friedman et al. ........... | 705/37 |
| 2004/0083156 | A1 * | 4/2004 | Schulze ........................ | 705/37 |
| 2004/0093300 | A1 * | 5/2004 | Burns ........................... | 705/37 |
| 2004/0128224 | A1 * | 7/2004 | Dabney et al. .............. | 705/37 |
| 2004/0181436 | A1 * | 9/2004 | Lange .......................... | 705/4 |
| 2005/0228731 | A1 * | 10/2005 | Coates ......................... | 705/35 |
| 2005/0234808 | A1 * | 10/2005 | Goto et al. .................. | 705/37 |
| 2005/0234810 | A1 * | 10/2005 | Goto et al. .................. | 705/37 |

(Continued)

FOREIGN PATENT DOCUMENTS

WO    WO 01/03038    *    1/2001

OTHER PUBLICATIONS

The 1998 Review of Electronic Transaction Systems in the U.S. Fixed Income Securities Markets, ©1998 by The Bond Market Association.*

(Continued)

*Primary Examiner* — Charles R. Kyle
*Assistant Examiner* — Robert R Niquette
(74) *Attorney, Agent, or Firm* — Zilka-Kotab, PC (57) ABSTRACT

A reverse auction system, method and computer program product are provided. A tender is received from a buyer over a network. Such tender includes information relating to a desired good or service. A plurality of suppliers is identified based on the information, and the tender is anonymously forwarded to the identified suppliers over the network. In use, a plurality of bids is received in response to the tender from a plurality of the suppliers over the network, and such bids are consolidated. Further, the consolidated bids are forwarded to the buyer over the network.

18 Claims, 4 Drawing Sheets

U.S. PATENT DOCUMENTS

| | | | | |
|---|---|---|---|---|
| 2005/0246260 A1* | 11/2005 | Hodgdon et al. | | 705/36 |
| 2005/0289043 A1* | 12/2005 | Maudlin | | 705/37 |
| 2006/0015436 A1* | 1/2006 | Burns et al. | | 705/37 |
| 2006/0020531 A1* | 1/2006 | Veeneman et al. | | 705/35 |
| 2006/0041501 A1* | 2/2006 | Tabata et al. | | 705/37 |
| 2006/0080221 A1* | 4/2006 | Murakami | | 705/37 |
| 2006/0085318 A1* | 4/2006 | Cohoon | | 705/37 |
| 2006/0136324 A1* | 6/2006 | Barry et al. | | 705/37 |
| 2006/0149649 A1* | 7/2006 | Hernandez | | 705/35 |
| 2006/0253366 A1* | 11/2006 | Rebibo | | 705/37 |
| 2006/0271452 A1* | 11/2006 | Sparaggis | | 705/35 |
| 2007/0055598 A1* | 3/2007 | Arnott et al. | | 705/35 |
| 2007/0055599 A1* | 3/2007 | Arnott | | 705/35 |
| 2007/0078744 A1* | 4/2007 | Koss et al. | | 705/36 R |
| 2007/0118453 A1* | 5/2007 | Bauerschmidt et al. | | 705/36 R |
| 2007/0118454 A1* | 5/2007 | Bauerschmidt et al. | | 705/36 R |
| 2007/0118455 A1* | 5/2007 | Albert et al. | | 705/37 |
| 2007/0118459 A1* | 5/2007 | Bauerschmidt et al. | | 705/37 |
| 2007/0118460 A1* | 5/2007 | Bauerschmidt et al. | | 705/37 |
| 2007/0136172 A1* | 6/2007 | West | | 705/36 R |
| 2007/0239571 A1* | 10/2007 | Michaletz | | 705/35 |
| 2007/0244762 A1* | 10/2007 | Du Preez et al. | | 705/26 |
| 2008/0071702 A1* | 3/2008 | Howard et al. | | 705/36 R |
| 2008/0091622 A1* | 4/2008 | Yass et al. | | 705/36 R |

OTHER PUBLICATIONS

M2 Presswire, TalkingStocks Morning Alerts. TalkingStocks.com. Aug. 29, 2005.* www.priceline.com, 2005.

www.servicemagic.com, 2005.

www.lendingtree.com, 2005.

www.ebay.com, 2005.

* cited by examiner

REVERSE AUCTION SYSTEM, METHOD AND COMPUTER PROGRAM PRODUCT

FIELD OF THE INVENTION

The present invention relates to network-based auctioning, and more particularly to reverse auctioning systems.

BACKGROUND

The rise of networked computing environments such as the Internet is rapidly changing the way that modern businesses market and sell their goods and/or services to buyers. Conventional business transactions, as practiced in the nonelectronic, non-networked world, may be imitated and in some instances improved by utilizing these cutting edge technologies. Because the Internet is global in scope, and further because electronic information is easier and less expensive to store, transmit and analyze than paper-based information, the Internet provides a unique opportunity for buyers and suppliers (e.g. sellers, etc.) to reach each other using novel approaches.

One such approach that has gained popularity in recent years is the electronic auction. Auctions over electronic networks have the potential to address large numbers of buyers by posting auction items (descriptions of goods and/or services) traditionally available only to those in the vicinity of the auction or to those who actively seek out the auction in some other manner. By vastly increasing the number of potential buyers with little or no marginal increase in the costs of administering the auction, a supplier increases both the chances that a sale will be made as well as the likelihood that favorable sales terms will be realized.

In a similar manner, reverse auctions work to maximize a buyer's returns. In a reverse auction, buyers post the names and/or descriptions of products or services that they wish to purchase from one of a select group of suppliers. The suppliers bid against each other, using successively lower bids, in order to gain the opportunity to provide the buyer with the product or service. In the reverse auction system, the supplier with the lowest bid after a certain portion of time traditionally wins the right to supply the buyer with the product or service for that price. Reverse auctions allow buyers to obtain excellent prices on goods and services while minimizing the amount of comparison shopping necessary to obtain such prices. Reverse auctions may also benefit suppliers in that they can acquire information about the pricing, terms and/or other conditions utilized by their competitors.

By connecting buyers and suppliers directly with each other, the Internet is eliminating the "middleman" that is present in normal businesses, thereby working to maximize returns for both buyers and suppliers. However, there is still much work to be done to optimize the reverse auction experience.

SUMMARY

A reverse auction system, method and computer program product are provided. A tender is received from a buyer over a network. Such tender includes information relating to a desired good or service. A plurality of suppliers is identified based on the information, and the tender is anonymously forwarded to the identified suppliers over the network. In use, a plurality of bids is received in response to the tender from a plurality of the suppliers over the network, and such bids are consolidated. Further, the consolidated bids are forwarded to the buyer over the network.

DETAILED DESCRIPTION

Figure 1:
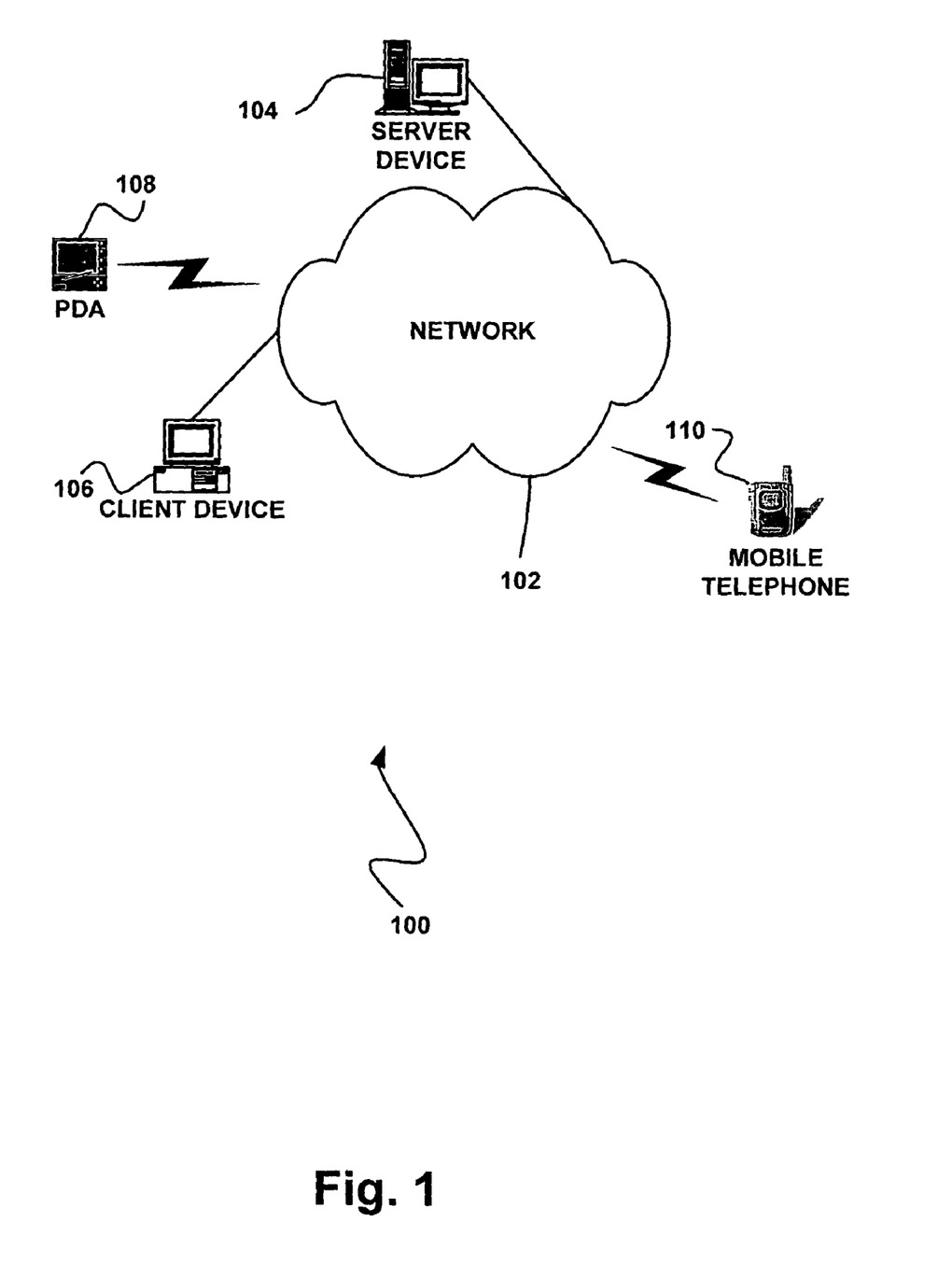
FIG. 1 illustrates a network architecture, in accordance with one embodiment.

FIG. 1 illustrates a network architecture 100, in accordance with one embodiment. As shown, a network 102 is provided. In the context of the present network architecture 100, the network 102 may take any form including, but not limited to a telecommunications network, a local area network (LAN), a wireless network, a wide area network (WAN) such as the Internet, etc. While only one network is shown, it should be understood that two or more similar or different networks 102 may be provided.

Coupled to the network 102 is a plurality of devices. For example, a server device 104 and an end user computer 106 may be coupled to the network 102 for communication purposes. Such end user computer 106 may include a desktop computer, lap-top computer, and/or any other type of logic. Still yet, various other devices may be coupled to the network 102 including a personal digital assistant (PDA) device 108, a mobile phone device 110, etc.

It should be noted that any of the foregoing devices in the present network architecture 100, as well as any other unillustrated hardware and/or software, may be equipped with reverse auctioning capabilities. More exemplary information regarding such architecture and associated functionality will be set forth hereinafter in greater detail.

Figure 2:
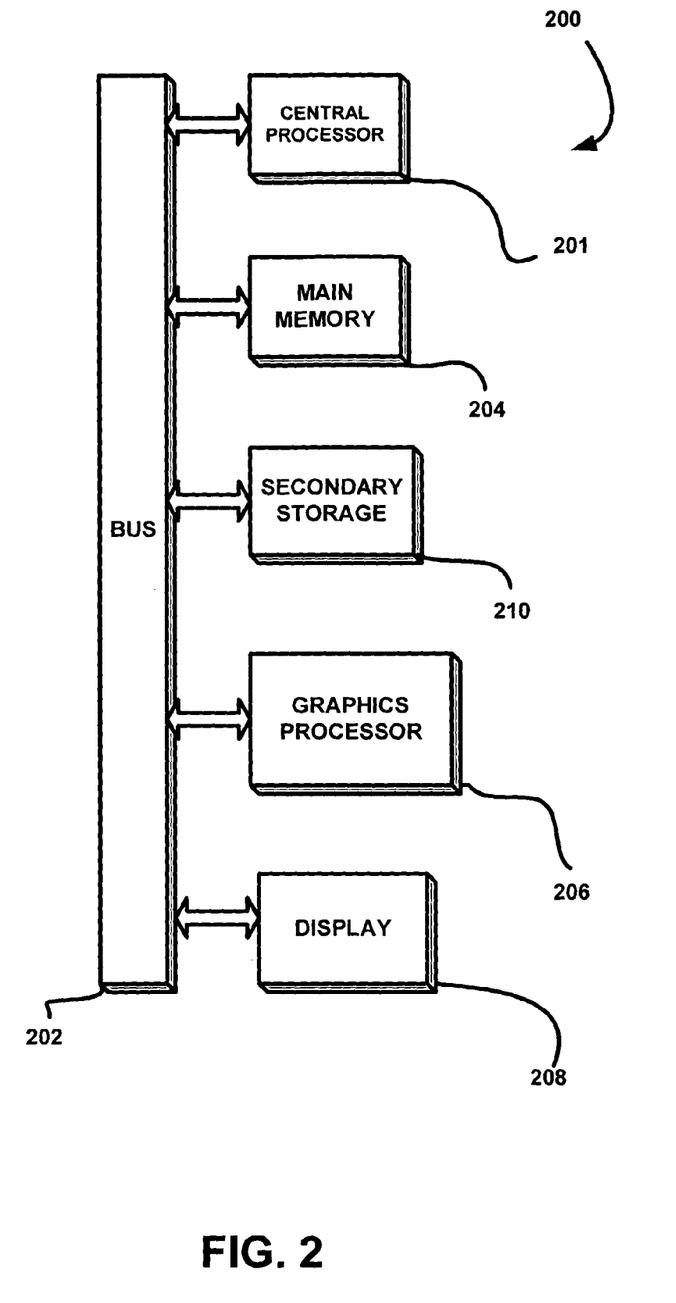
FIG. 2 illustrates an exemplary computer system, in accordance with one embodiment.

FIG. 2 illustrates an exemplary computer system 200, in accordance with one embodiment. As an option, the computer system 200 may be implemented in the context of any of the devices of the network architecture 100 of FIG. 1. Of course, the computer system 200 may be implemented in any desired environment.

As shown, a computer system 200 is provided including at least one central processor 201 which is connected to a communication bus 202. The computer system 200 also includes main memory 204 [e.g. random access memory (RAM), etc.]. The computer system 200 also includes a graphics processor 206 and a display 208, i.e. a computer monitor.

The computer system 200 may also include a secondary storage 210. The secondary storage 210 includes, for example, a hard disk drive and/or a removable storage drive, representing a floppy disk drive, a magnetic tape drive, a compact disk drive, etc. The removable storage drive reads from and/or writes to a removable storage unit in a well known manner.

Computer programs, or computer control logic algorithms, may be stored in the main memory 204 and/or the secondary storage 210. Such computer programs, when executed, enable the computer system 200 to perform various functions. The memory 204, storage 210 and/or any other storage are possible examples of computer-readable media.

Figure 3:
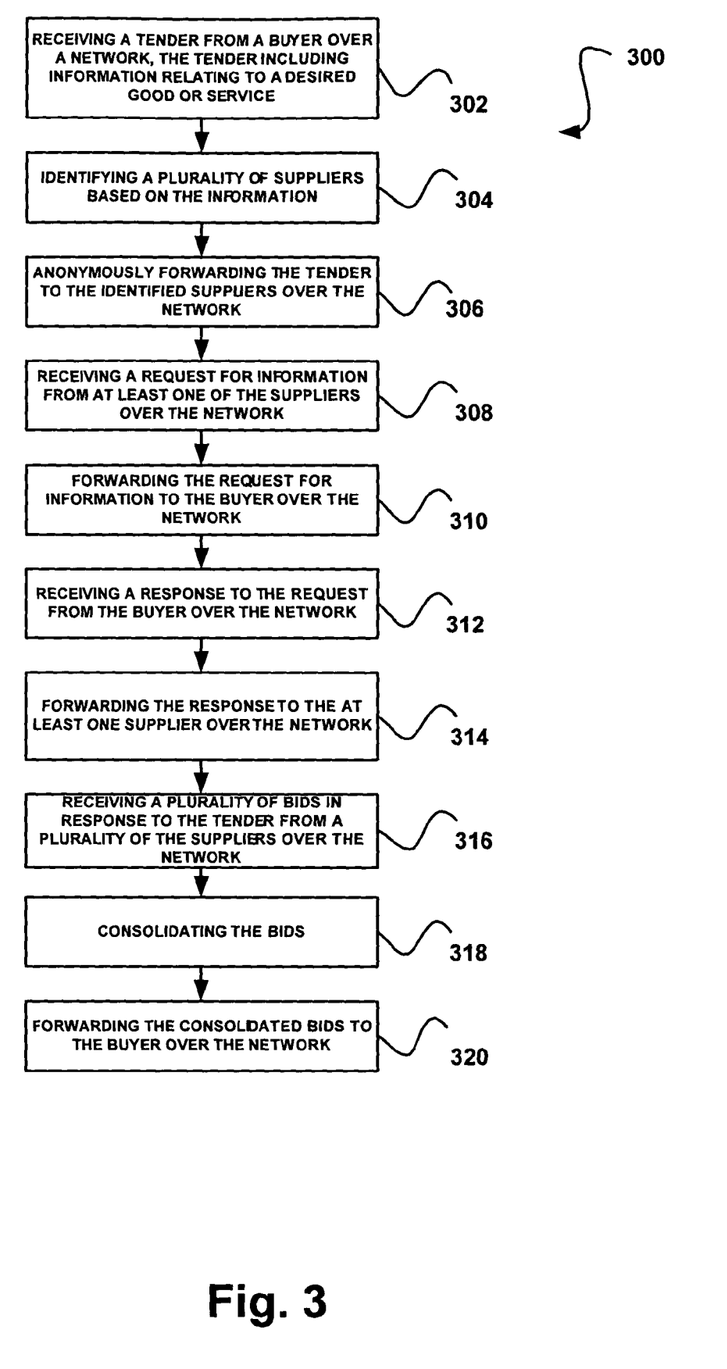
FIG. 3 shows a method for reverse bidding in e-commerce transactions, in accordance with one embodiment.

FIG. 3 shows a method 300 for reverse bidding in e-commerce transactions, in accordance with one embodiment. As an option, the present method 300 may be implemented in the context of the architecture and environment of FIGS. 1 and/or 2. Of course, however, the method 300 may be implemented in any desired environment.

As shown in operation 302, a tender from a buyer including information relating to a desired good or service is received over a network. The network may include the Internet, and/or any other network (e.g. see, for example, the network 102 of FIG. 1, etc.) capable of receiving the tender from the buyer. Further, the tender may be received by e-mail, by receiving input via a website, and/or by any other manner capable of receiving the tender from the buyer utilizing any desired network.

In the context of the present description, the term tender may refer to any offer to provide something of value (e.g. money, services, etc.) in exchange for the good or service. Still yet, the information may include a price, a description of the desired good or service, a category of the desired good or service, a desired location of the supplier, a location of the buyer, a desired date of receipt of the good or service by the buyer, a deadline for bid submissions by prospective suppliers, a deadline to request additional information (for reasons that will soon become apparent), etc. For that matter, the information may include any information that relates to the desired good or service (which is further deemed to include the desired transaction associated with obtaining such good or service).

A plurality of suppliers is then identified based on the information of operation 302, as illustrated in operation 304. The plurality of suppliers may include any suppliers capable of or potentially being capable of supplying the desired good or service. For example, the suppliers may be identified according to a category of the good or service. Thus, for instance, if a buyer desires to purchase a toy, suppliers of toys may be identified. Additionally, the plurality of suppliers may be filtered according to the information. Just by way of example, only suppliers within a city specified in the tender by the buyer may be identified. For that matter, in the context of the present description, the suppliers may be identified in any way that utilizes, at least in part, the aforementioned information from operation 302.

The tender of operation 302 is then anonymously forwarded to the identified suppliers of operation 304 over the network, as shown in operation 306. The tender may be anonymously forwarded by e-mail (e.g. utilizing a third-party domain name, etc.), by delivering via a website, and/or by any other manner capable of forwarding the tender to the identified suppliers utilizing any desired network. Thus, the tender may be submitted to suppliers while also maintaining the anonymity and therefore the privacy of the buyer.

Strictly as an option, a request for additional information from at least one of the suppliers may then be received over the network, as shown in operation 308. Again, the request may be made in any form, such as by e-mail, by receiving input via a website, and/or by any other manner capable of receiving the request from the at least one supplier utilizing any desired network.

The request may be a specific request from a particular supplier, or may be an automatically generated request from a supplier. For example, the supplier may be capable of automatically sending a request for particular additional information in response to tenders. Still yet, an automated feature may be provided that reviews the information received with the tender, and then requests any additional information that is required to ensure that the supplier always receives a minimal set of information.

If multiple suppliers request additional information, the requests may optionally be collected and consolidated. Of course, such requests may be consolidated in any way, such as, for example, listing all requests in a single document or web page. The request may include anything, such as a request for a deadline for bid submissions, a request for a deadline of receipt of the good or service by the buyer, a request for a deadline for sending additional requests to the buyer, etc. Again, the additional information may include any information that relates to the desired good or service (which is further deemed to include the desired transaction associated with obtaining such good or service).

The request for additional information is then forwarded to the buyer over the network, as in operation 310. Yet again, the request may be forwarded by e-mail, by delivery via a website, and/or by any other manner capable of forwarding the request to the buyer utilizing any desired network.

If multiple suppliers make requests in operation 308, the requests may be forwarded to the buyer in a consolidated format, thus allowing the buyer to only respond to one set of requests (and possibly reduce and/or eliminate the need to respond to more than one redundant request). However, in other embodiments, each request for additional information by a supplier may be forwarded separately to the buyer such that the buyer is required to respond separately to each request.

Next, in operation 312, a response to the request for additional information is received from the buyer over the network, and is then forwarded to the at least one supplier, as shown in operation 314. Again, such response may be received and forwarded via any of the modes discussed hereinabove. The response may include any information desired to be communicated by the buyer to the supplier(s), in response to the request(s).

A plurality of bids may then be received in response to the tender from a plurality of the suppliers over the network, as illustrated in operation 316. The bids may involve any data capable of allowing a buyer to select at least one bid including, but not limited to a price for the good or service, a time the good or service may be made available to the buyer, a description of the good or service, etc.

The plurality of bids may also be consolidated as shown in operation 318. Such consolidation may include creating a summary list of all of the bids. The consolidated bids may also include unedited bids, so that the buyer receives all relevant data received from the suppliers. Furthermore, such summary list may associate each bid with a supplier and any other data given by the supplier in association with the bid. Of course, such summary list may also be formatted in any desired manner, such as by price in descending order, etc.

The consolidated bids are then forwarded to the buyer over the network, as shown in operation 320. Specifically, the consolidated bids of operation 318 may be forwarded to the buyer in the form of the list. In this way, the buyer is able to view all of the bids collectively. The buyer may then contact at least one supplier with respect to a listed bid, and may choose a supplier to provide the desired good or service.

In one embodiment, the buyer may contact any desired supplier directly without an intermediary. In other contemplated embodiments, the buyer may select the bid associated with the chosen supplier, such that the selection is capable of being received and forwarded, in a manner similar to the communications set forth hereinabove. Of course, it should be noted that the buyer may decide not to contact any of the suppliers. Therefore, an efficient and anonymous service is provided to a buyer for receiving offers from suppliers in association with a tender made by the buyer.

As an option, a bill may be sent to at least one of the suppliers. For example, the bill may be based on a registration by a supplier for receiving tenders from buyers (such that only registered, paying suppliers receive bids), a number of tenders received by the supplier, a number of bids submitted by a supplier, a number of winning bids, and/or any other criteria associated with use of the present system. To this end, a business model may be provided in association with such a system.

In one embodiment, the various operations 302-320 may be carried out by one or more service providers separate from the buyer and suppliers. More illustrative information will now be set forth regarding various optional architectures and features with which the foregoing method 300 may or may not be implemented by such a service provider. It should be strongly noted that the following information is set forth for illustrative purposes and should not be construed as limiting in any manner. Any of the following features may be optionally incorporated with or without the exclusion of other features described.

Figure 4:
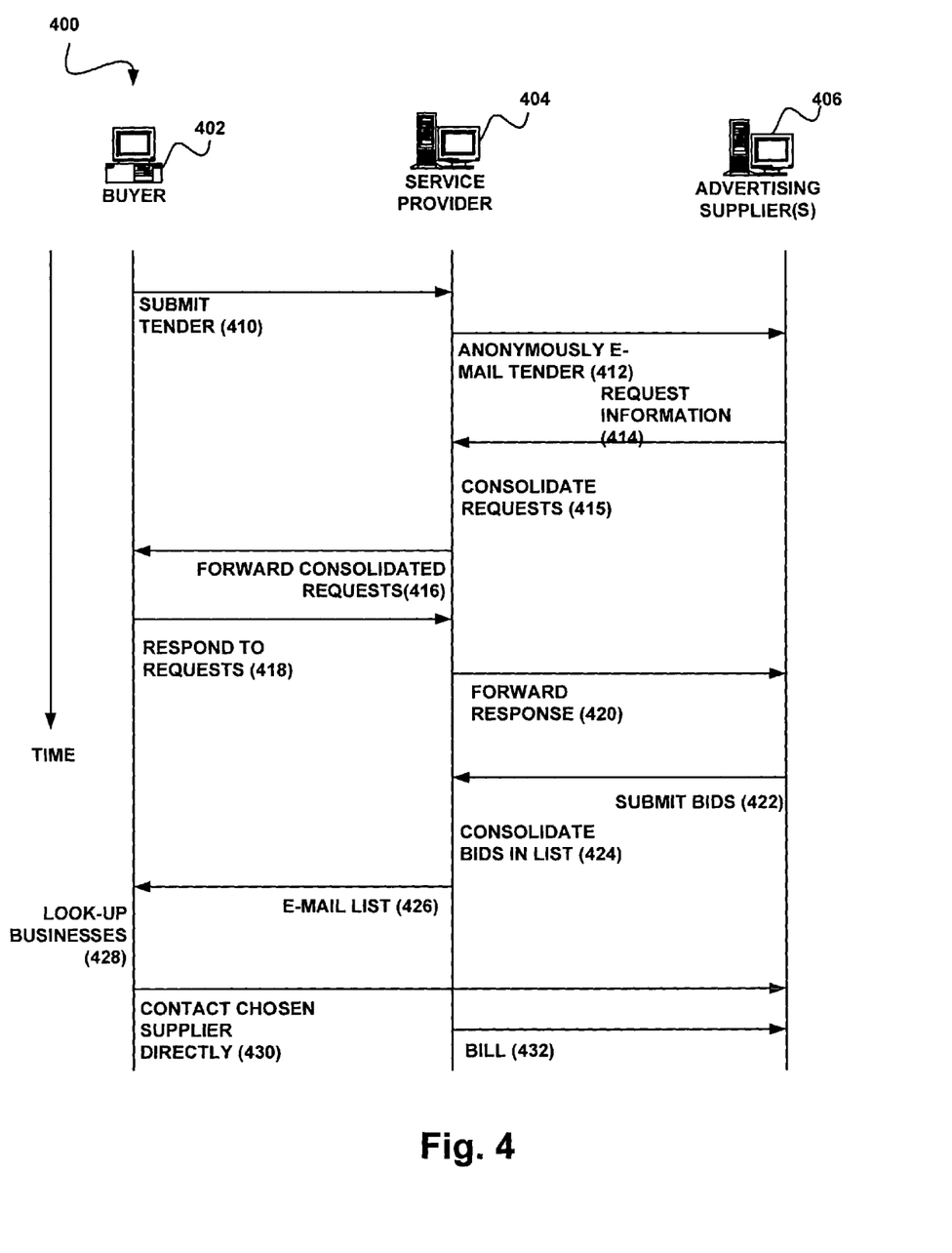
FIG. 4 shows a method for reverse bidding in e-commerce transactions, in accordance with another embodiment.

FIG. 4 shows a method 400 for reverse bidding in e-commerce transactions, in accordance with another embodiment. As an option, the present method 400 may be implemented in the context of the architecture and environment of FIGS. 1-3 (including the definitions provided in the description of FIG. 3). Of course, however, the method 400 may be implemented in any desired environment.

As shown, a buyer 402 submits a tender to a service provider 404, as shown in operation 410. The service provider may optionally be separate from the buyer 402 and advertising suppliers 406. Furthermore, the service provider 404 may operate a server device (e.g. see, for example, the server device 104 of FIG. 1, etc.) that is coupled between client devices (e.g. see, for example, the devices 106, 108, and 110 of FIG. 1, etc.) that are operated by the buyer 402 and the advertising suppliers 406. The tender may be made in any form and may be associated with any good or service.

The tender is then anonymously e-mailed to at least one advertising supplier 406, as in operation 412. The advertising supplier 406 may be associated with the desired good or service in such a way that the number of advertising suppliers 406 receiving the e-mail that would not be able to supply the good or service are limited.

A request for information is sent from the advertising supplier 406 to the service provider 404, as illustrated in operation 414. If a plurality of requests for information is sent from a plurality of advertising suppliers 406 in operation 414, the requests are consolidated, as shown in operation 415. The consolidated requests are then forwarded to the buyer 402, as shown in operation 416. The buyer 402 may then respond to the requests for information which is sent to the service provider 404, as in operation 418. The response may subsequently be forwarded to all advertising suppliers 406 that received the tender, only those that bid, or only those that sent the original request (see operation 420).

Each advertising supplier 406 that received the tender in operation 412 may then submit a bid to the service provider 404 for providing the good or service associated with the buyer's 402 tender, as shown in operation 422. If a plurality of bids is submitted to the service provider 404 in operation 422, the bids may be consolidated into a bid list, as in operation 424. The bid list may then be e-mailed to the buyer 402 (see operation 426), and the buyer 402 may utilize the bid list for looking-up any number of businesses associated with the bids of advertising suppliers 406, as illustrated in operation 428. Additionally, the buyer 402 may be allowed to research the advertising suppliers 406.

The buyer 402 may then optionally contact any such business directly for purchasing the good or service, as in operation 430. As shown, a bill may also be sent from the service provider 404 to at least one of the advertising suppliers 406 (see operation 432). In this way, a buyer 402 may be provided with a way of submitting a tender for a good or service and receiving any number of bids from prospective suppliers 406 in an optionally anonymous and efficient manner.

While various embodiments have been described above, it should be understood that they have been presented by way of example only, and not limitation. For example, any of the network elements may employ any of the desired functionality set forth hereinabove. Thus, the breadth and scope of a preferred embodiment should not be limited by any of the above-described exemplary embodiments, but should be defined only in accordance with the following claims and their equivalents.

What is claimed is:

1. A computer-implemented auction method, comprising:
receiving a tender from a buyer over a network, the tender including information relating to a desired good or service;
identifying a plurality of suppliers based on the information;
anonymously forwarding the tender to the identified suppliers over the network, utilizing a hardware processor;
receiving a request for additional information from at least one of file suppliers over the network, and upon receiving the request, determining whether the deadline for requests for additional information has been passed;
conditionally forwarding the request for additional information to the buyer over the network based on the determination of whether the deadline for requests for additional information has been passed;
receiving a plurality of bids in response to the tender from a plurality of tile suppliers over tile network;
consolidating the bids;
and forwarding the consolidated bids to the buyer over the network;
wherein the information includes a deadline for requests for additional information;
wherein the consolidated bids are forwarded in a list;
wherein multiple suppliers request additional information, and the requests are collected and consolidated;
wherein the deadline for requests for additional information is separate from a deadline for bid submissions by prospective suppliers;
wherein the requests are consolidated by listing all of the requests in a single web page;
wherein the request for additional information received from the at least one of the suppliers over the network is automatically generated by the at least one of the suppliers as a result of an automated feature that reviews the information and automatically generates and sends the request for additional information for ensuring that the at least one of the suppliers receives a minimal set of information;
wherein each of the plurality of suppliers that received the anonymously forwarded tender is sent a bill based on a registration by the supplier for receiving the tenders.

2. A method as recited in claim 1, wherein the information includes a description of the desired good or service.

3. A method as recited in claim 1, wherein the information includes the deadline for bid submission.

4. A method as recited in claim 1, and further comprising receiving a response to the request from the buyer over the network.

5. A method as recited in claim 4, and further comprising forwarding the response to the at least one supplier over the network.

6. A method as recited in claim 5, wherein the receiving and forwarding is carried out by a service provider separate from the buyer and the suppliers.

7. A method as recited in claim 5, wherein the response to the request is forwarded to all suppliers from which one of the plurality of bids was received.

8. A method as recited in claim 6, wherein the service provider operates a server device coupled between client devices operated by the buyer and the suppliers.

9. A method as recited in claim 1, and further comprising allowing the buyer to research the suppliers.

10. A method as recited in claim 1, wherein the consolidated bids include the bids, unedited.

11. A method as recited in claim 1, wherein the tender is received utilizing website.

12. A method as recited in claim 11, wherein the tender is anonymously forwarded utilizing electronic mail.

13. A method as recited in claim 1, wherein the buyer is capable of contacting the suppliers directly in response to the bids.

14. A method as recited in claim 1, wherein the consolidated requests that are listed in the single web page eliminate the need for the buyer to respond to more than one redundant request.

15. A method as recited in claim 1, wherein each of the plurality of bids includes data given by the supplier from which the bid was received, the data including a price for the good or service, a time the good or service is to be made available to the buyer, and a description of the good or service.

16. A method as recited in claim 1, wherein each of the bills sent to the plurality of suppliers are based on at least one of: a number of tenders received by the supplier, a number of bids submitted by the supplier, and a number of the supplier's winning bids.

17. A non-transitory computer readable storage medium embodying a computer program, the computer program comprising:
   computer code for receiving a tender from a buyer over a network, the tender including information relating to a desired good or service;
   computer code for identifying a plurality of suppliers based on the information;
   computer code for forwarding the tender to the identified suppliers over the network;
   computer code for receiving a request for additional information from at least one of the suppliers over the network, and upon receiving the request, determining whether the deadline for requests for additional information has been passed;
   computer code for conditionally forwarding the request for additional information requests for additional information has been passed;
   computer code for forwarding the request for additional information to the buyer over the network;
   computer code for receiving a response to the request from the buyer over the network;
   computer code for forwarding the response to the at least one supplier over the network;
   computer code for receiving a plurality of bids in response to the tender from a plurality of the suppliers over the network; and
   computer code for forwarding the bids to the buyer over the network;
   wherein the information includes a deadline for requests for additional in formation;
   wherein the computer program product is operable such that the consolidated bids are forwarded in a list;
   wherein the computer program product is operable such that multiple suppliers request additional information, and the requests are collected and consolidated;
   wherein the deadline for requests for additional information is separate from a deadline for bid submissions by prospective suppliers;
   wherein the computer program product is operable such that the requests are consolidated by listing all of the requests in a single web page;
   wherein the computer program, product is operable such that the request for additional information received from the at least one of the suppliers over the network is automatically generated by the at least one of the suppliers as a result of an automated feature that reviews the information and automatically generates and sends the request for additional information for ensuring that the at least one of the suppliers receives a minimal set of information
   wherein the computer program product is operable such that each of the plurality of suppliers that receive the forwarded tender is sent a bill based on a registration by the supplier for receiving, the tenders.

18. A computer-implemented auction method, comprising:
   receiving a tender from a buyer over a network, the tender including information relating to a desired good or service;
   identifying a plurality of suppliers based on the information;
   anonymously forwarding the tender to the identified suppliers over the network, utilizing a hardware processor;
   receiving a request for additional information from at least one of the suppliers over the network, and upon receiving the request, determining whether the deadline for requests for additional information has been passed;
   conditionally forwarding the request for additional information to the buyer over the network based on the determination of whether the deadline for requests for additional information has been passed;
   receiving a response to the request from the buyer over the network;
   forwarding the response to the at least one supplier over the network;
   receiving a plurality of bids in response to the tender from a plurality of the suppliers over the network;
   consolidating the bids; and
   forwarding the consolidated bids to the buyer over the network;
   wherein the buyer is capable of contacting the suppliers directly in response to the bids;
   wherein the information includes a deadline for requests for additional information;
   wherein the consolidated bids are forwarded in a list;
   wherein multiple suppliers request additional information, and the requests are collected and consolidated;
   wherein the deadline for requests for additional information is separate from a deadline for bid submissions by prospective suppliers;
   wherein the requests are consolidated by listing all of the requests in a single web page;
   wherein the request for additional information received from the at least one of the suppliers over the network is automatically generated by the at least one of the suppliers as a result of an automated feature that reviews the information and automatically generates and sends the request for additional information for ensuring that the at least one of the suppliers receives a minimal set of information;
   wherein each of the plurality of suppliers that receive the anonymously forwarded tender is sent a bill based on a registration by the supplier for receiving the tenders.

* * * * *

UNITED STATES PATENT AND TRADEMARK OFFICE
CERTIFICATE OF CORRECTION

| | | |
|---|---|---|
| PATENT NO. | : 7,996,298 B1 | Page 1 of 1 |
| APPLICATION NO. | : 11/218224 | |
| DATED | : August 9, 2011 | |
| INVENTOR(S) | : Avishai Catane | |

It is certified that error appears in the above-identified patent and that said Letters Patent is hereby corrected as shown below:

In the claims:
Claim 1, col. 6, line 25; please replace "file" with --the--;
Claim 1, col. 6, line 33; please replace "of tile" with --of the--;
Claim 1, col. 6, line 33; please replace "over tile" with --over the--;
Claim 1, col. 6, line 55; please replace "received" with --receive--;
Claim 11, col. 7, line 14; please insert --a-- after "utilizing" and before "website";
Claim 17, col. 7, line 49; please insert --to the buyer over the network based on the determination of whether the deadline for-- after "information" and before "requests";
Claim 17, col. 8, line 7; please remove the "," after "program" and before "product";
Claim 17, col. 8, line 14; please insert a --;-- after "information"; and
Claim 17, col. 8, line 18; please remove the "," after "receiving" and before "the tenders".

Signed and Sealed this
Twenty-ninth Day of November, 2011

David J. Kappos
*Director of the United States Patent and Trademark Office*